United States Patent [19]

Wicker

[11] Patent Number: 4,983,949
[45] Date of Patent: Jan. 8, 1991

[54] SAFETY UNIT ACTUATING DEVICE
[75] Inventor: James H. Wicker, Charlotte, N.C.
[73] Assignee: Specialty Manufacturing Co., Inc., Charlotte, N.C.
[21] Appl. No.: 303,849
[22] Filed: Jan. 30, 1989
[51] Int. Cl.[5] .............................................. G08B 5/22
[52] U.S. Cl. .................................. 340/433; 116/28 R; 180/281; 340/487
[58] Field of Search ...................... 340/425.5, 433, 487, 340/472, 482; 116/28 R, 51, 52, DIG. 15; 180/271, 281, 289; 280/765.1, 766.1; 293/21, 22, 117; 246/125; 40/466; 318/282

[56] References Cited
U.S. PATENT DOCUMENTS

| 4,138,668 | 2/1979 | Latta, Jr. et al. | 340/433 |
| 4,339,744 | 7/1982 | Latta, Jr. | 340/433 |
| 4,559,518 | 12/1985 | Latta, Jr. | 340/433 |
| 4,697,541 | 10/1987 | Wicker | 116/28 R |
| 4,766,413 | 8/1988 | Reavell | 340/433 |
| 4,816,804 | 3/1989 | Reavell | 340/433 |
| 4,825,192 | 4/1989 | Wells | 340/433 |

Primary Examiner—Joseph A. Orsino
Assistant Examiner—Brent A. Swarthout
Attorney, Agent, or Firm—Shefte, Pinckney & Sawyer

[57] ABSTRACT

An actuating device for use in moving a school bus safety unit, such as a stop sign or crossing arm, between a retracted position adjacent the school bus, and an extended position projecting outwardly from the bus. The actuating device includes a drive motor and a friction-type slip clutch which permits the safety unit to be manually moved from its extended or retracted positions without damage to the drive arrangement for moving the safety unit, and several alternative control circuits may be utilized to automatically or semi-automatically return the safety unit to its retracted and/or extended positions if manually moved therefrom.

18 Claims, 16 Drawing Sheets

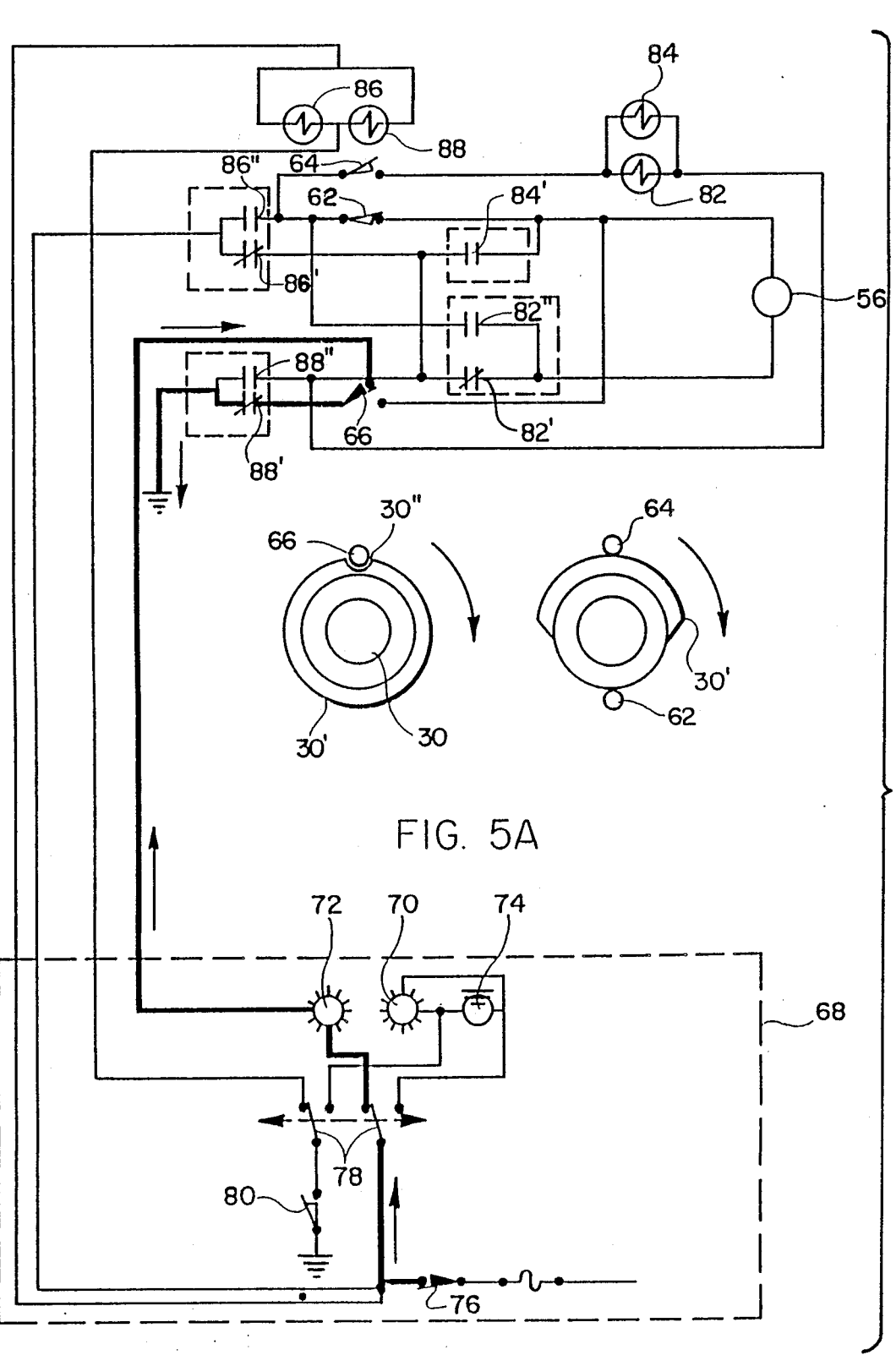

FIG. 5E'
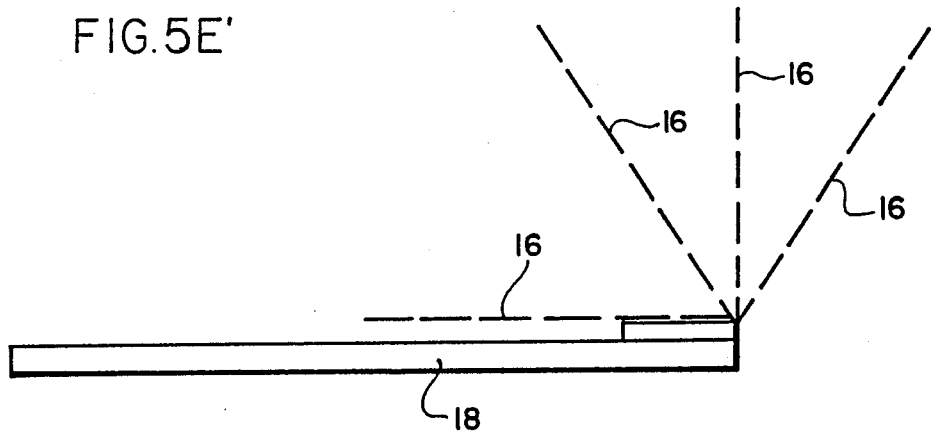
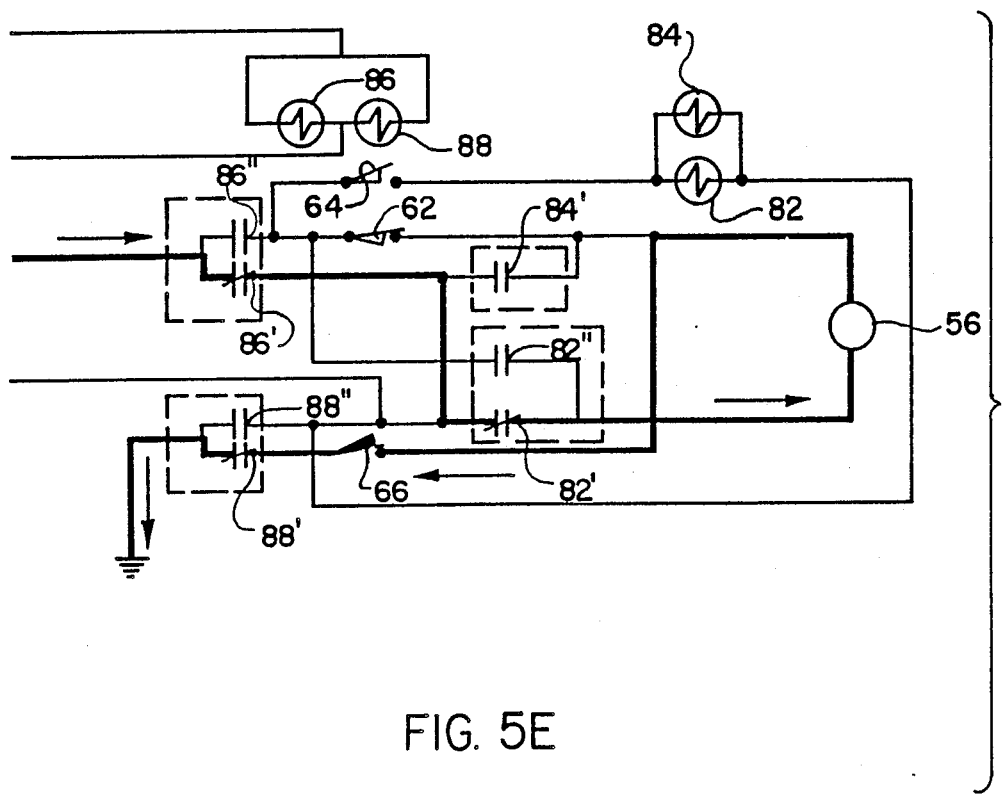
FIG. 5E

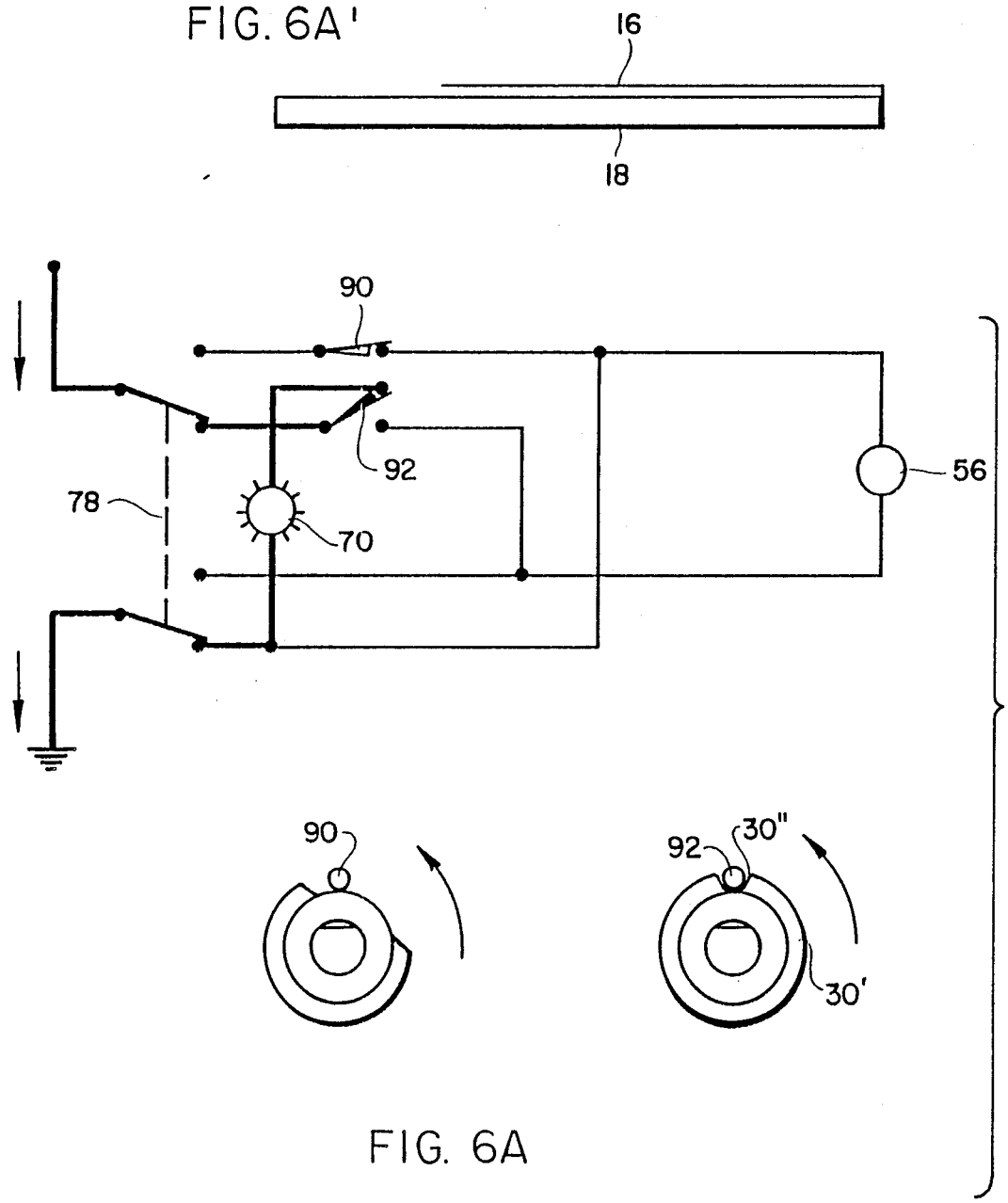

FIG. 6B'
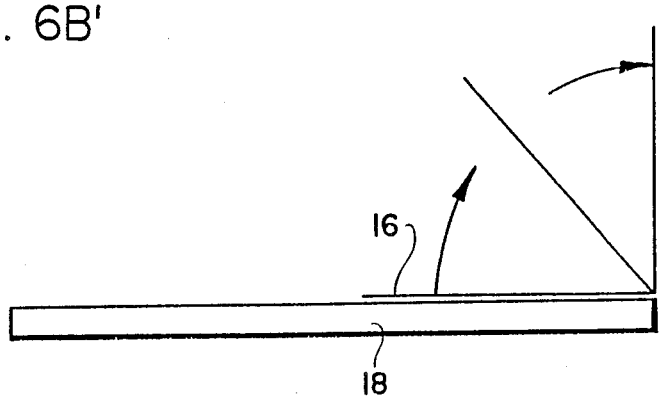
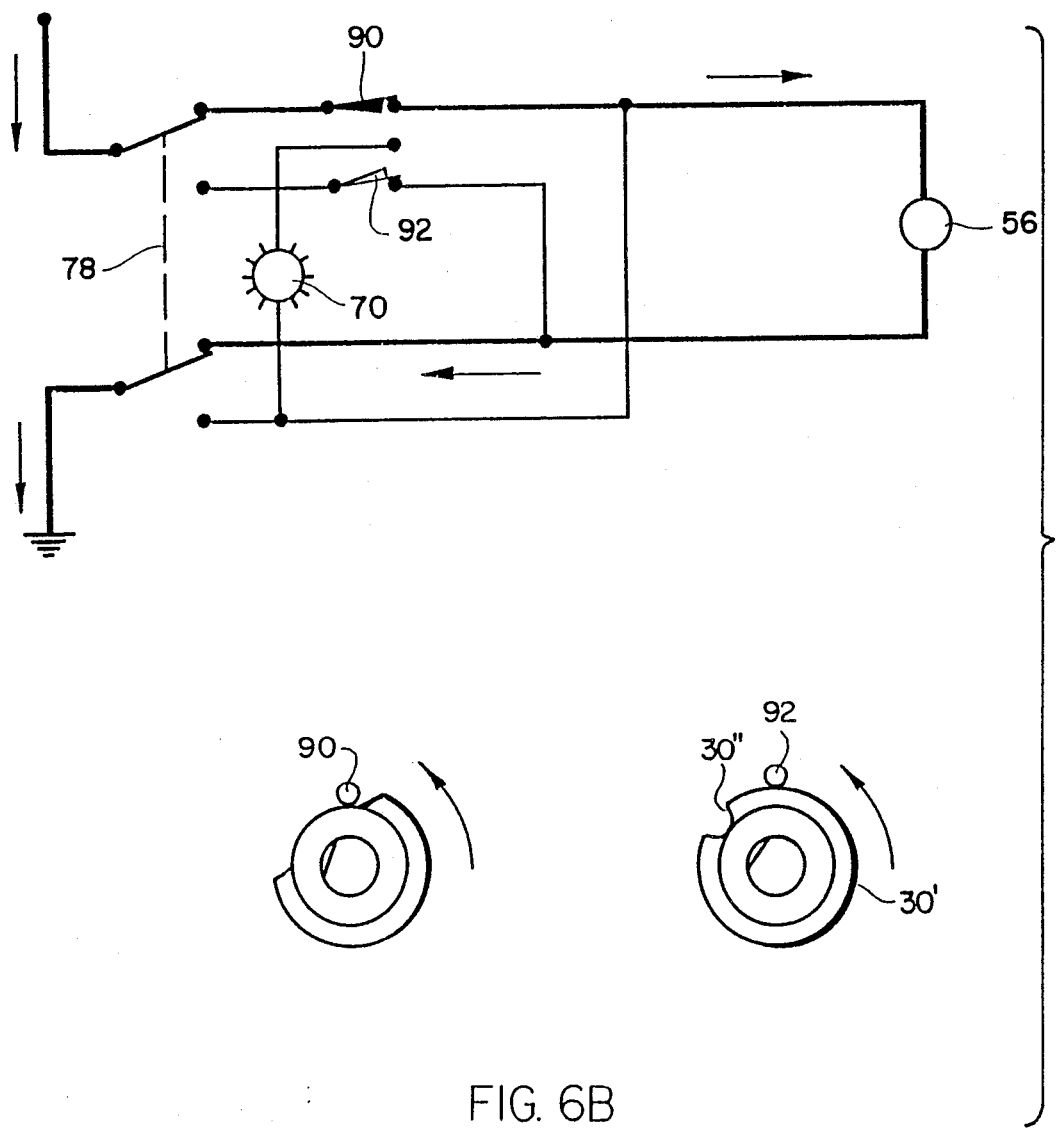
FIG. 6B

FIG. 6D'
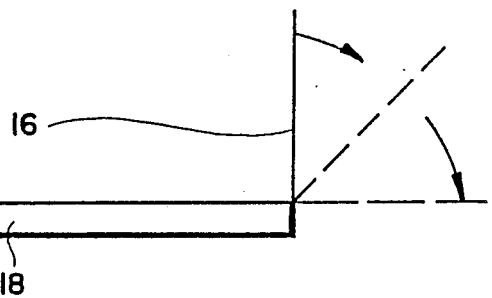
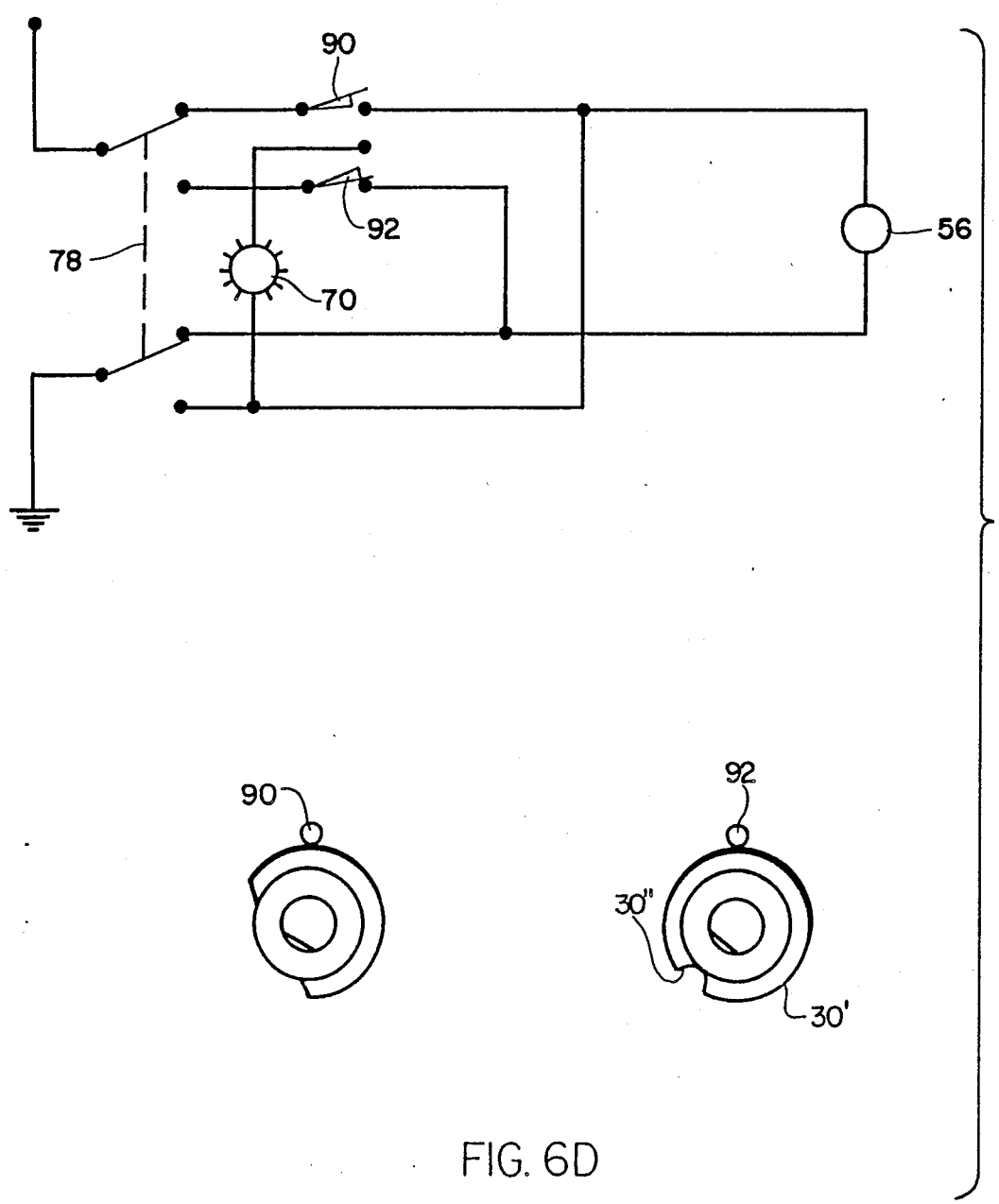
FIG. 6D

SAFETY UNIT ACTUATING DEVICE

BACKGROUND OF THE INVENTION

The present invention relates generally to devices that are mounted on vehicles to operate safety units associated with the vehicle, such as crossing arms, stop signs and the like which are mounted on school buses for selective movement between a retracted or passive position adjacent the school bus and an extended or active position at which the safety unit extends outwardly from the bus to perform a safety function.

It is, of course, well known that children, particularly young children, who are transported in school buses are vulnerable to accidents involving the school bus or the children themselves during the time they are leaving or approaching the school bus, and it is therefore common practice to provide school buses with safety units that are designed to reduce the risk of such accidents.

One familiar safety unit that is almost universally found on school buses is the octagonal stop sign that is usually mounted on one side of the school bus, and that is movable from a normal retracted position along the side of the school bus to an extended position projecting outwardly from the side of the bus to warn other motorists that children are leaving or approaching the school bus so that such motorists can stop all movement of their vehicles until the children have safely boarded the bus or cleared the area after leaving the bus. Typical stop sign safety devices of this type are disclosed in Latta U.S. Pat. Nos. 4,138,668; 4,339,744; and 4,559,518.

Another familiar safety unit frequently found on school buses is a crossing arm that is usually mounted on the front bumper of the school bus and that is arranged for pivotal movement from a first retracted or passive position at which the generally lengthy crossing arm extends along and adjacent the bumper to a second active position at which it extends outwardly and generally perpendicular with respect to the bumper, thereby providing a barrier that forces children to walk in a path well away from the front bumper of the school bus so that the driver of the school bus can readily see the children and avoid moving the bus until they have cleared the area in front of the bus. The construction and operation of crossing arms of this type are disclosed in greater detail in Latta U.S. Pat. No. 4,559,518, Wicker U.S. Pat. No. 4,697,541 and Runkle U.S. Pat. No. 3,153,398.

As discussed in the above-identified prior art patents, the actuating devices for moving the safety units between their retracted and deployed or extended positions may be vacuum (or air) operated, or they may be electrically operated, and such actuating devices are generally designed to stop movement only at the retracted and deployed positions. However, since the safety units, at their deployed positions, are extending outwardly and generally perpendicularly from the school bus, they invite the attention of children, and others, and offer a tempting target to be pushed away from such extended position by the children passing by the extended safety unit. Also, even in their retracted positions, the safety units present a temptation for children to pull them outwardly from such retracted position. Obviously, if the actuating device for the safety unit included only a rigid drive connection between the operating mechanism (e.g. electric motor) and the movable safety unit, any such manual pushing or pulling force applied directly to the safety unit could damage or even destroy the operating mechanism of the actuating device.

To overcome this problem, it is now common practice to provide safety unit actuating devices with a double-acting hinge construction of the type generally disclosed in Latta U.S. Pat. No. 4,138,668 that includes relatively heavy coil springs that are arranged to resist any manual movement of the safety unit from its set position, and, if a manual force is applied to the safety unit of sufficient magnitude to move the safety unit from its set position, the springs will return the safety unit to its original set position. Also, there is another known hinge device that accomplishes generally the same function as the aforesaid double-acting hinge by utilizing a combination of a biasing spring and cam surface arrangement, whereby manual movement of the safety unit causes the cam to move along a cam surface until the safety unit is released, and the spring then returns the safety unit to its extended position. The cam surface has a configuration such that if the safety units moved within a predetermined range from its extended position, it will return to its extended position, but if it is moved beyond such predetermined range and toward its retracted position, it will be moved by the spring to the retracted position rather than returned to the extended position. An example of this type of hinge device is disclosed in U.S. Pat. No. 4,766,413.

While the aforesaid hinge arrangements serve their intended purpose of permitting some manual movement of the safety unit, usually without damage to the actuating device, and returning the safety unit to its original position after it has been manually moved, these arrangements still have some disadvantages. First, the springs used to return the safety unit to its original position must be relatively strong to accomplish this purpose, and, as a result, when a safety unit is manually moved a considerable distance from one of its set positions (e.g. the deployed position) and released, the return movement caused by the springs has a whipping action that can present an unsafe condition if a child is in the path of the safety unit during its return. This problem is more pronounced in conjunction with crossing arms because of the considerable extending length of the arm. Additionally, the construction of the hinge arrangement, and the corresponding drive unit that includes crank arms, connecting arms and related mechanisms, add to the cost of manufacturing the devices. Finally, even with a break-away type hinge arrangement, there can be circumstances under which the direct drive system from an electrical drive motor can be misused in such a manner as to strip the motor or otherwise damage the drive arrangement.

The present invention provides an actuating device for safety units which is more reliable and safer than known devices of this type, and it provides a construction that is less complicated and less expensive than known constructions.

SUMMARY OF THE INVENTION

In accordance with the present invention, an actuating device for operating a safety unit such as a crossing arm, stop sign or the like is provided for moving the safety unit between a first retracted position adjacent a vehicle, such as a school bus, and a second extended position extending outwardly from the vehicle in a deployed position. The actuating device includes a mounting arrangement for mounting the device on the vehicle, and has a motor provided with an output drive means. A pivot member, which may be utilized to support a crossing arm, a stop sign, or the like, or which may be an integral part thereof, is arranged in the housing for pivotal movement between its retracted and extended or deployed positions. A clutch is provided for interconnecting the motor drive and the pivot means, such clutch normally providing a positive driving engagement between the motor drive and the pivot means whereby the pivot means is moved by the motor output drive between its retracted and deployed positions, and the clutch also permits the pivot means to be moved relative to the motor drive means when a predetermined force is applied at the pivot means, such as the manual pushing or pulling of the pivot means and its attachments by a child. A control circuit is provided for operating the motor to selectively move the support between its retracted and deployed positions.

In one disclosed embodiment of the present invention, the control circuit is designed to automatically return the pivot means to its retracted or deployed position at a predetermined speed whenever the pivot means is moved from either of said positions by the application of a predetermined manual force. In another embodiment of the present invention, the control circuit is designed to return the pivot means to its retracted or deployed position from which it has been moved, but in this semi-automatic embodiment, a toggle switch is provided and return movement of the pivot means takes place when the toggle switch is manually operated, even when the safety unit is manually moved away from its extended position. Finally, in a third embodiment of the present invention, the control circuit causes the pivot means to be moved between its retracted and deployed positions in normal operation, but if the pivot means is manually moved from one of such positions by the application of a predetermined force, the pivot means will remain at that position. The pivot means can then be manually returned to its original position, or, in some cases, the operation of the motor will return the pivot means to its retracted position. In any event, the control circuit may include an indicating device which lets the operator of the vehicle know when the safety unit is not located at its fully retracted position.

Preferably, the clutch device associated with the present invention is a slip clutch having a first movable portion that is connected to the motor drive, a second movable portion connected to the pivot means, and a frictional member for normally simultaneously engaging the first and second clutch portions during positive driving engagement between the motor and the pivot means, and the frictional member is constructed to disengage either or both of the first and second movable portions when the aforesaid predetermined manual force is applied to the pivot means. By virtue of this arrangement, the clutch provides a positive drive for the pivot means during normal operation, but permits abnormal movement of the pivot means without damaging the drive or the motor if the pivot means is moved relative to the motor, such as by a child pushing and pulling the safety unit attached to the pivot means.

BRIEF DESCRIPTION OF THE DRAWINGS

FIGS. 5A-5E illustrate diagrammatically the control circuit operation of the present invention for the fully automatic embodiment;

FIGS. 6A-6E illustrate diagrammatically the operation of the control circuit in the semi-automatic embodiment of the present invention.

DESCRIPTION OF THE PREFERRED EMBODIMENTS

Looking now in greater detail at the accompanying drawings, FIGS. 1-4 illustrate the mechanical portions of the preferred embodiment of the present invention, and FIGS. 5-7 disclose different embodiments of control circuits that can be utilized in conjunction with the present invention.

Figure 1:
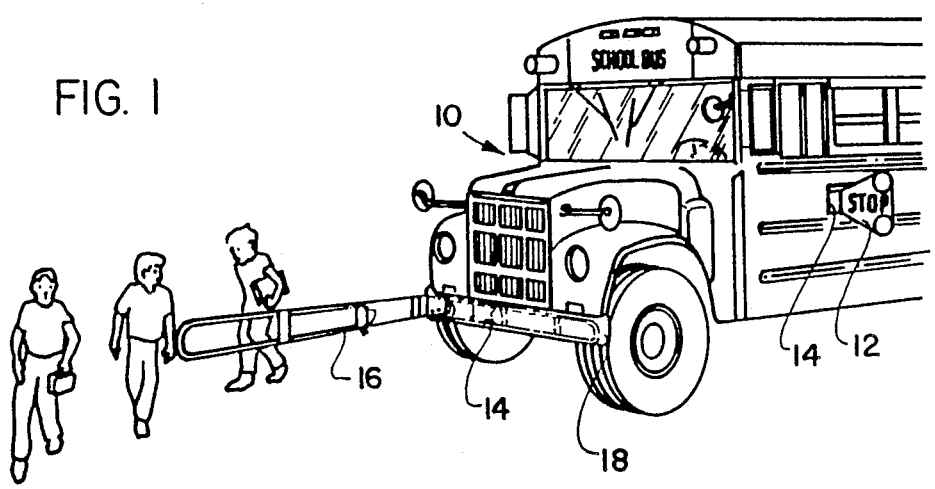
FIG. 1 illustrates a school bus employing both a stop sign safety unit, and a crossing arm safety unit, both of which are illustrated in their extended or retracted positions.

A typical school bus 10 is shown in FIG. 1 as having two types of safety units associated with the bus, namely a stop sign 12 carried at the side of the bus in a housing 14 for movement between a retracted position along side the bus and an extended position at which it extends outwardly from the side of the bus in a generally perpendicular relation thereto, and a crossing arm 16 carried in a housing 14 attached to the front bumper 18 of the bus, the crossing arm 16 being movable between a retracted position at which it extends along the length of the bumper 18 as shown in dotted lines in FIG. 1, and an extended position at which it extends generally perpendicular to the bumper 18 as shown in full lines in FIG. 1. The stop sign 12 performs the well-known function of alerting motorists in the vicinity of the school bus that the school bus has stopped to load or unload children, and the crossing arm 16 is moved to its extended position as shown in FIG. 1 when the school bus has stopped to load or unload children, whereby the children are required to walk around the extended crossing arm 16 in full view of the driver of the school bus so as to avoid any accidental movement of the school bus when a child is located in front of the school bus.

Figure 3:
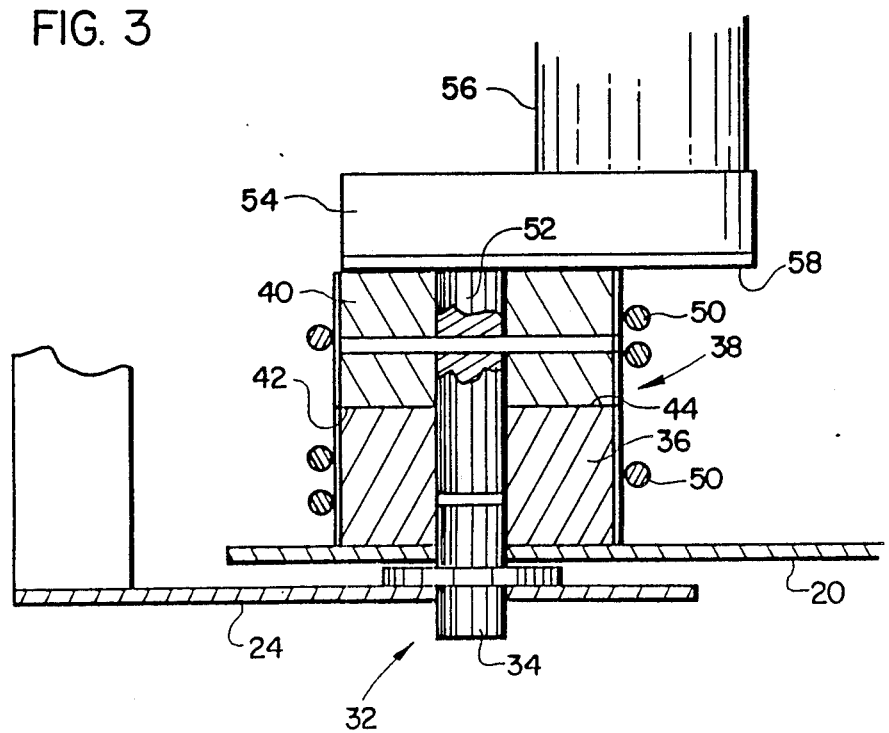
FIG. 3 is a detailed view, partially in section, illustrating the clutch arrangement of the present invention.
Figure 4:
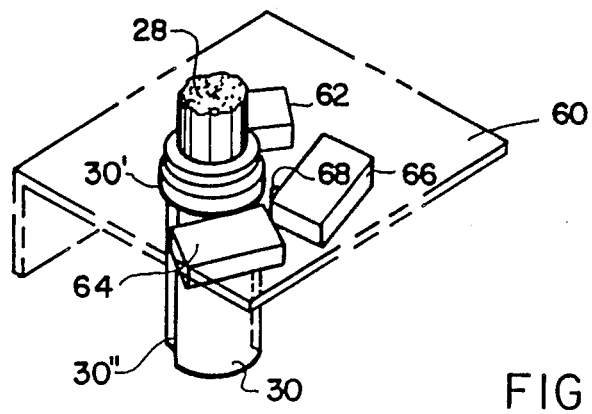
FIG. 4 is a detailed view illustrating the limit switches forming part of the control circuit of the present invention.

Since the stop sign 12 and the crossing arm 16 may be operated by substantially similar operating arrangements, only one such arrangement is shown and described in FIGS. 1-7, but it will be understood that such arrangement could be used with either the stop sign 12 or the crossing arm 16, or both. The housing 14 includes a generally U-shaped support 20 for mounting the actuating device and safety unit on a vehicle such as school bus 10 using bolts 22. A pivot member 24 is mounted to the support 20 by an upper pivot shaft assembly 26 that includes, at its upper end, a stub shaft 28 that permits pivotal movement of the pivot member 24 with respect to the support 20. The stub shaft 28 is an extended portion of a cam shaft 30 located within the housing 14 and which will be described in greater detail below. The lower end of the pivot member 24 is mounted on the support 20 by a lower pivot shaft assembly 32 that includes a pivot shaft 34 extending upwardly through the bottom flange of the support 20 with its extending end being engaged by the first clutch component 36 of a friction clutch arrangement 38 as best seen in FIG. 3. The clutch assembly 38 also includes a second clutch component 40, the first and second clutch components 36 and 40 being generally cylindrical in shape and resting against one another at surfaces 44 and 42, respectively. A sleeve member 46 surrounds both of the clutch components 36 and 40 so as to be in contact with the external cylindrical surfaces of both such components, and the sleeve member 46 is maintained in contact with such exterior surfaces by a plurality of biasing elements 50 which are preferably in the form of steel rings expanded beyond their normal diameter so as to exert a biasing force against the sleeve member 46 and maintain it in frictional engagement with the exterior surfaces of the clutch components 36 and 40. The second clutch component 40 is generally fixed to a drive shaft 52 extending from a gear reduction unit 54 that is driven by an electric motor 56, the gear reduction unit 54 being selected to reduce the output revolutions of the motor 54 to a predetermined speed selected for use with the present invention. The electric motor 56 and the gear reduction unit 54 are preferably carried on a bracket 58 secured to the support 20, and the drive shaft 52 extends through the bracket 58 and is rotatable therein. Another similar bracket 60 is carried by the support 20, and the previously described stub shaft 28 extends downwardly through the horizontal flange of the bracket 60 to an integral connection with the aforesaid cam shaft 30, and a first limit switch 62, a second limit switch 64, and a third limit switch 66 are mounted at the lower surface of the bracket 60 for selective engagement with the cam shaft 30. The cam shaft 30 is specially formed with camming surfaces 30' and longitudinal grooves 30" which are generally shown in FIG. 4, and which are more specifically shown in FIGS. 5a–5e. Each of the limit switches 62–66 includes a switch element 68 extending therefrom (see FIG. 4) which are controlled by the cam surfaces 30' and the grooves 30" to move the switches between open and closed positions as will be described in greater detail below.

Figure 5B:
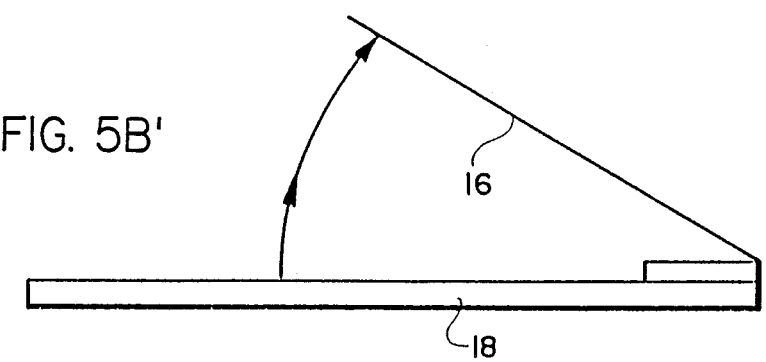
Figure 5B:
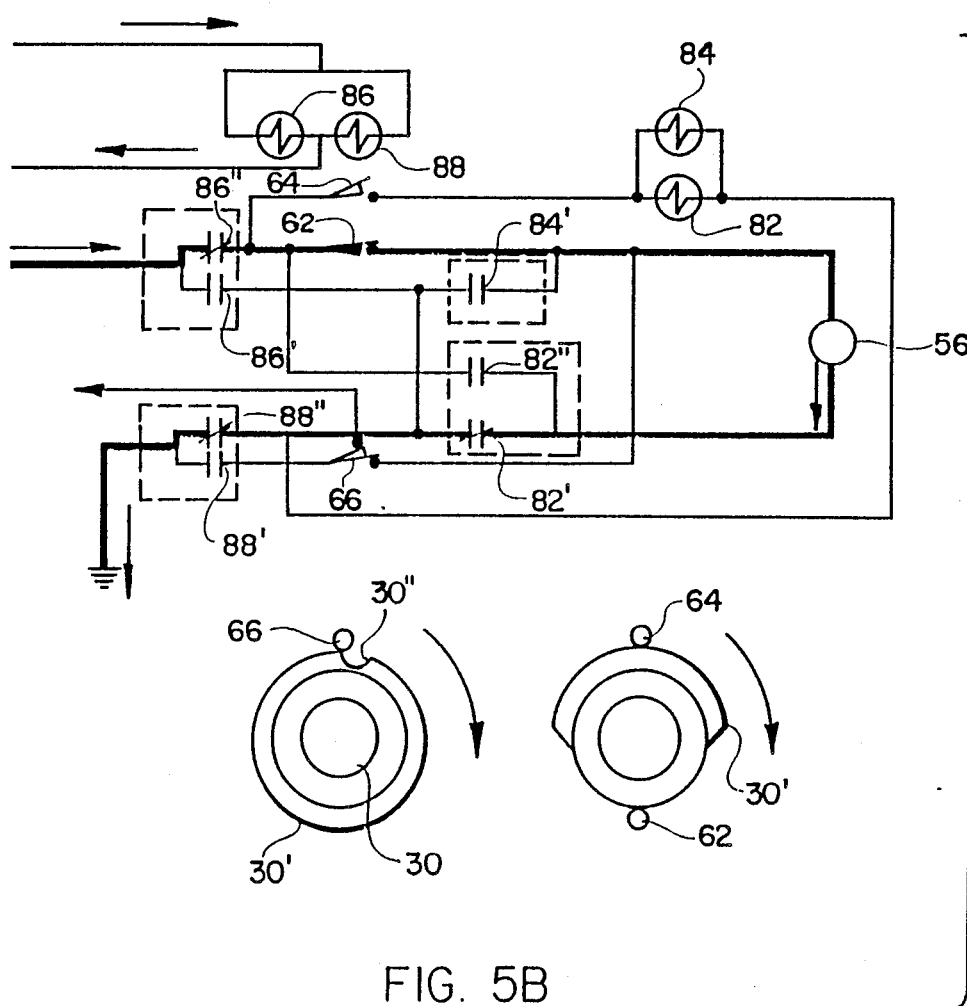

The control circuit for the fully automatic embodiment of the present invention is illustrated diagrammatically in FIGS. 5a–5e, each such Figure showing, in sequence, the operation of the control circuit. To enhance the understanding of the control circuit, each circuit condition is accompanied by a diagrammatic showing of the position of the crossing arm 16 with respect to the bumper 18 and the arrangement of the limit switches 62, 64, 66 in relation to the cam shaft 30 at that particular condition of the control circuit. Looking first at FIG. 5a, the lower portion thereof illustrates a control panel 68 indicated by dotted lines that would normally be contained within the interior of the school bus 10, such control panel including a red pilot light 70, a green pilot light 72, and a buzzer or other audible alarm device 74. The control panel also includes a conventional ignition switch 76 for the school bus, which is shown in its closed position, and a double-pole double-throw switch 78 movable between a first position as shown in FIG. 5a and a second position at which the switch elements would move to the right to engage the two contacts which are shown as disengaged in FIG. 5a. The switch 78 is manually moved between its two aforesaid positions by the operator of the school bus.

The control circuit also includes a conventional door switch 80 generally found in school buses, the door switch 80 being shown in its open position in FIG. 5a, which is its normal position when the bus is moving and the door of the school bus is closed. In the upper portion of FIG. 5a, the components of the control circuit that would normally be carried in the housing 14 are shown in a condition when the school bus is moving along a roadway and not loading or unloading children, in which case the crossing arm 16 is at its retracted position extending along and parallel to the bumper 18. These components include a first relay 82 having a first normally closed contact 82' and a normally opened contact 82"; a relay 84 having a normally opened contact 84'; a third relay 86 having a normally closed contact 86' and a normally opened contact 86"; and a fourth relay 88 having a normally closed contact 88' and a normally opened contact 88". In the condition shown in FIG. 5a, the motor 56 is de-energized by virtue of the two relay contacts 86" and 88" being in their normal open position. However, it will be noted that limit switch 66 is in a position so that a circuit is completed through the ignition switch 76, one pole of the switch 78, the green light 72, the limit switch 66, and the normally closed contact 88', such closed circuit being indicated by the use of a somewhat heavier line in FIG. 5a. Thus, in this condition of the control circuit, the crossing arm is maintained in its aforesaid retracted position, and the green light 72 on the control panel is lit to indicate to the operator of the school bus that the crossing arm is in its "safe" or retracted position.

Figure 2:
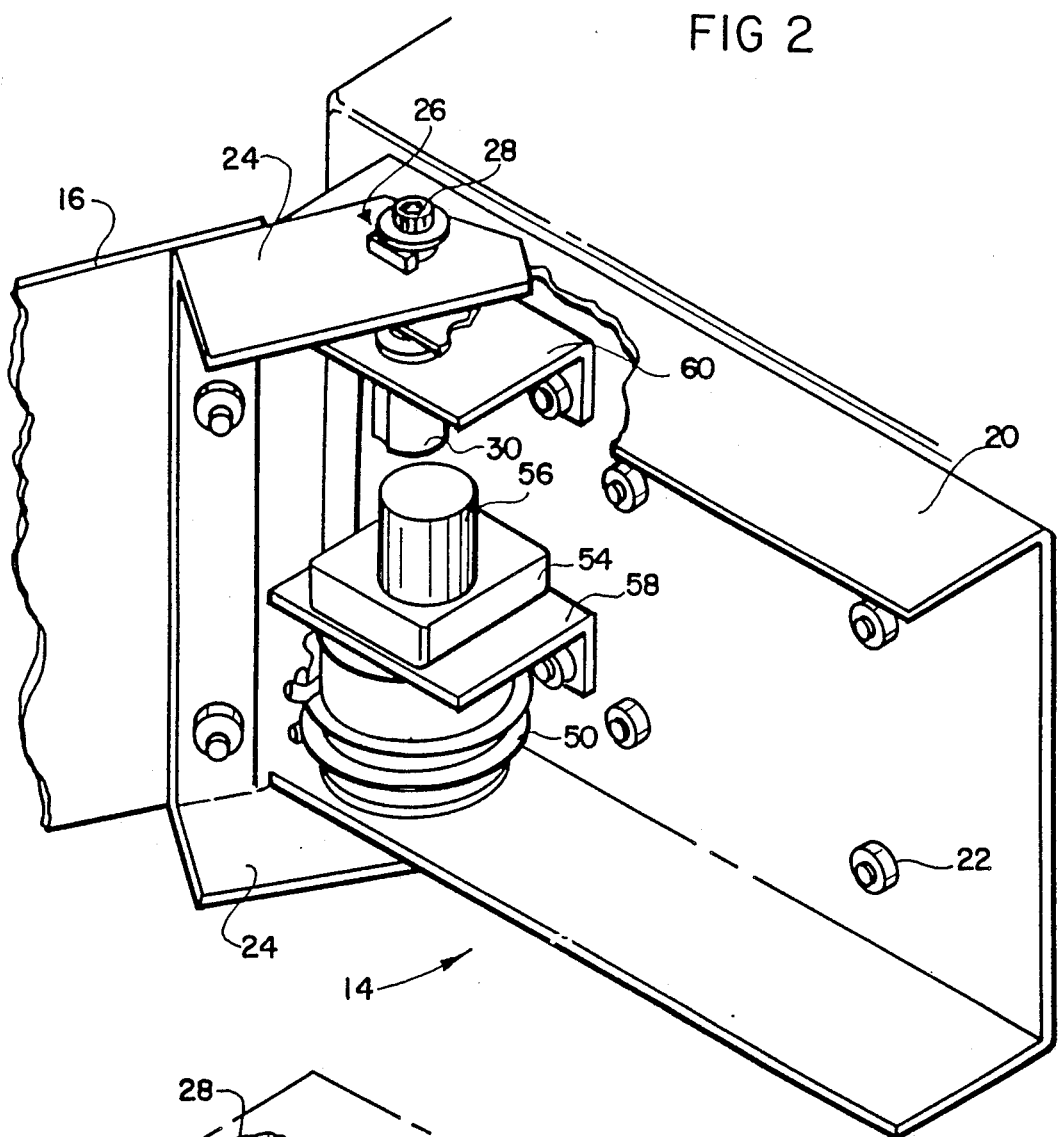
FIG. 2 is a detailed perspective view illustrating the housing and mounting arrangement for the pivot means, and the drive arrangement for moving the pivot means, the electrical components being omitted from this view for clarity of illustration.

When the school bus 10 stops to load or unload children, the door of the school bus is opened so as to close switch 80 (see FIG. 5b), thereby completing a circuit through relays 86 and 88 which, in turn, closes contacts 86" and 88" while opening contacts 86' and 88'. In this condition, a circuit, as shown in the heavier lines, is completed through the ignition switch 76 and the motor 56 which drives the drive shaft 52 in one direction of rotation. The drive shaft 52, operating through the engaged friction clutch assembly 38, rotates the pivot shaft 34 and the pivot member 24 in a clockwise direction as shown in FIG. 2, whereby the crossing arm 16 begins to move outwardly away from the bumper 18. Also, it will be noted that when the pivot member 28 is rotated, the cam shaft 30 also rotates so that the switch actuator 68 of limit switch 66 moves out of its groove or indentation as shown diagrammatically in the lower part of FIG. 5b, whereby limit switch 66 engages its lowermost contact so as to open the circuit through the green light 70 to warn the school bus operator that the crossing arm 16 is not in its retracted position.

Figure 5C:
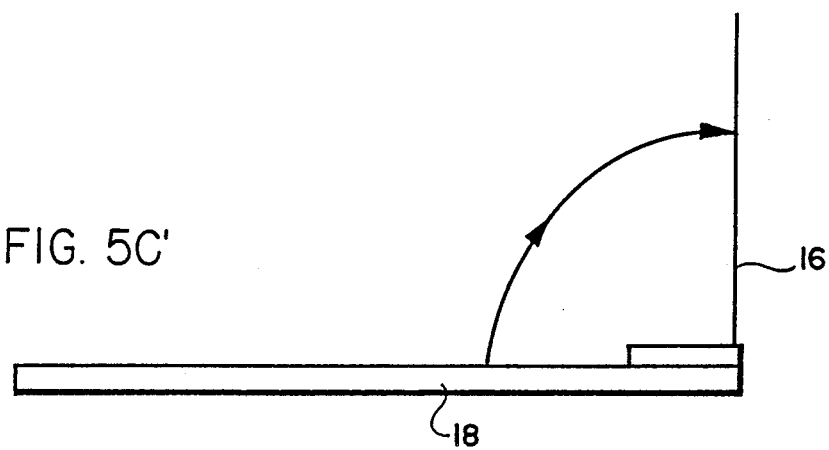
Figure 5C:
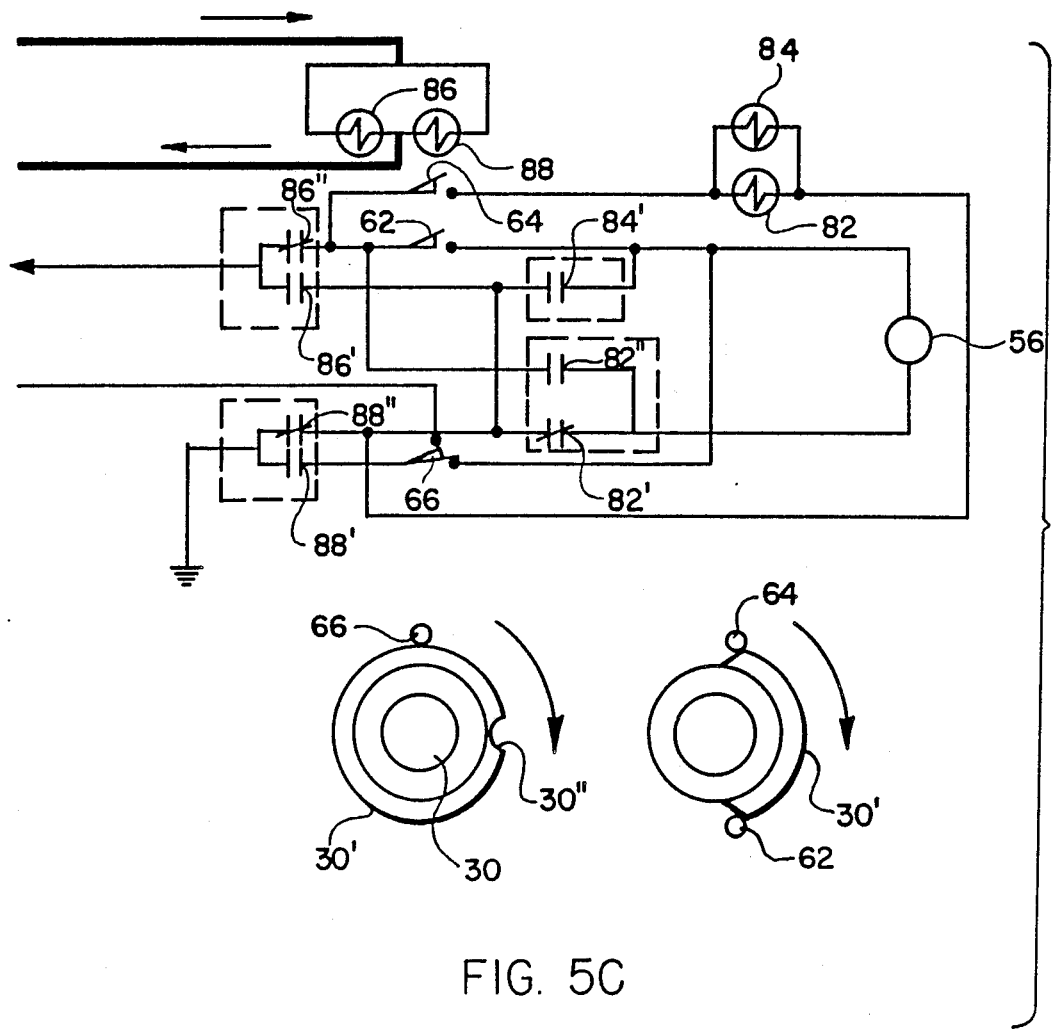

When the drive motor 56 has operated a sufficient period of time to move the crossing arm 16 to its fully extended position, at which it is disposed at a 90° angle with respect to the bumper 18, the cam surface 30' causes limit switch 62 to be moved to its open position as shown in the lower portion of FIG. 5c. This opening of the limit switch 62 opens the previously described closed circuit through the motor 56, whereby the motor is de-energized and the crossing arm remains at its extended, perpendicular position. If, at this extended position, a force of a predetermined magnitude is exerted against the crossing arm 16, such as by a child pushing against the crossing arm while passing thereby, the control circuit will automatically cause the crossing arm to be returned to its fully extended position as shown in FIG. 5d.

Figure 5D:
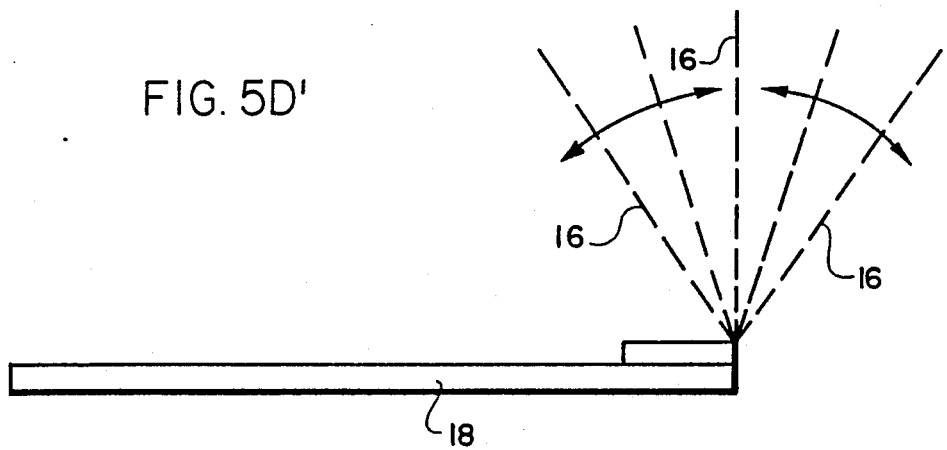
Figure 5D:
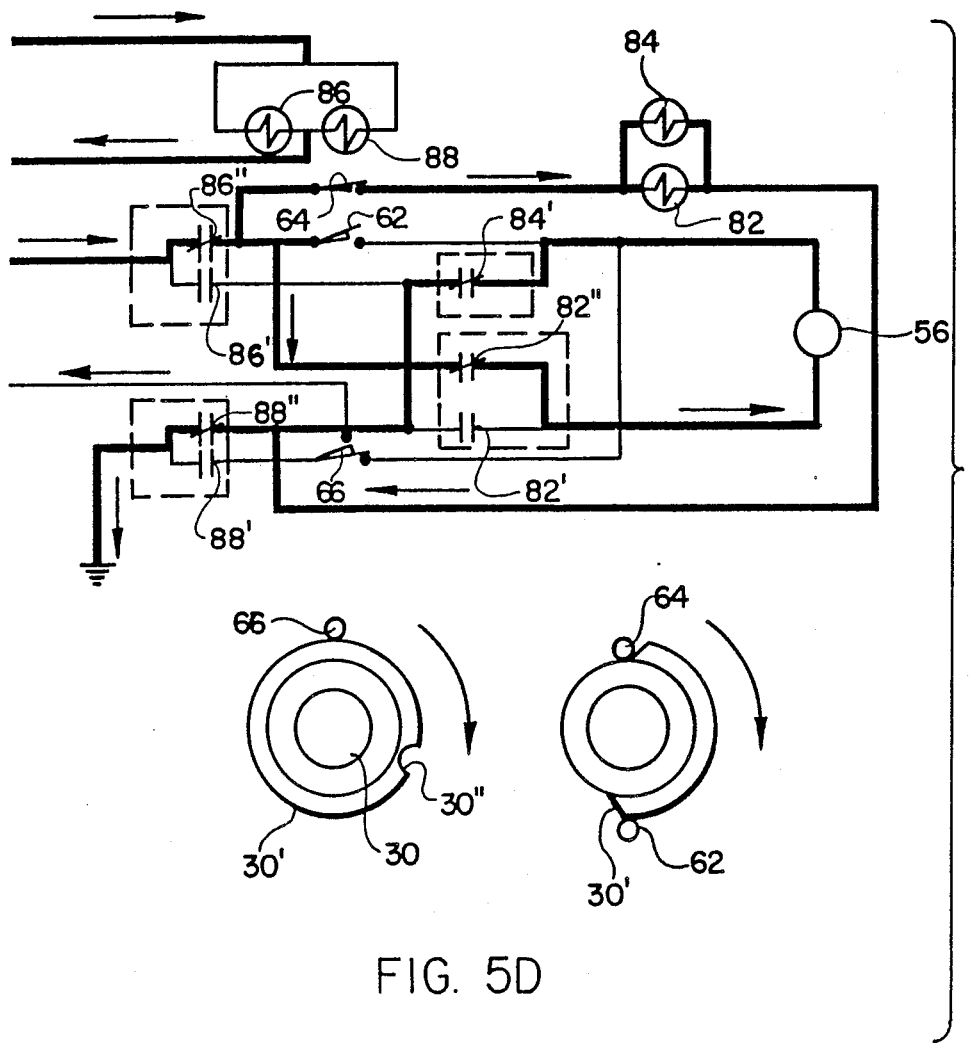

Looking at FIG. 5d, if the crossing arm 16 is pushed beyond its perpendicular position and away from the bumper 18, this movement will be translated through the pivot member 24 and pivot shaft 28 to cam shaft 30 so that the cam surface 30' will cause limit switch 64 to move to a closed position as shown in FIG. 5d, whereupon a circuit is completed through relays 82 and 84 which, in turn, completes a circuit through motor 56 to rotate it in a counter-clockwise direction as shown by the heavy lines in FIG. 5d. When motor 56 is energized by this closed circuit, it will cause the pivot member 24 to be driven through clutch assembly 38, as described above, to move the crossing arm 16 in a direction back towards its perpendicular or fully extended position, and when crossing arm 16 reaches its fully extended position the limit switch 64 will be opened and the circuit will be in a condition like that shown in FIG. 5c with the motor 56 de-energized and the crossing arm 16 maintained at its fully retracted position. On the other hand, if a predetermined force is applied to the crossing arm to move it away from its fully retracted position and back toward the bumper 18, limit switch 62 will be closed by cam surface 30', whereby a circuit is completed through the motor 56 as shown in FIG. 5b so that the crossing arm is moved back toward its fully extended position. When it reaches such fully extended position, limit switch 62 will be opened, and the circuit will assume the condition shown in FIG. 5c. Thus, it will be appreciated that if the crossing arm 16 is moved away from its fully extended position, in either direction, the control circuit will immediately react to such movement, and will automatically return the crossing arm to its fully extended position. If there is any obstruction in the path of such movement of the crossing arm 16, the friction clutch assembly 38 is designed so that the biasing rings 50 impose just enough bias to normally cause the first and second clutch elements 36 and 40 to move together, but to permit relative movement between the first and second components at any time the crossing arm 16, and hence the pivot member 24 and pivot shaft 34, are held stationary (such as by a child holding the crossing arm 16) while the motor 56 is energized to turn the drive shaft 52 and the second clutch component 40.

Looking now at FIG. 5e, if the crossing arm 16 is located at any position other than its retracted position along side the bumper 18, and if the operator of the bus closes the door of the bus to thereby open door switch 80, the circuit through relays 86 and 88 is opened so that such relays are deactivated, and a circuit is completed through normally closed contacts 86', 82' and 88', and through limit switch 66 to operate motor 56 in a direction of rotation that will cause the crossing arm 16 to be moved in a direction back towards the bumper 18 and its fully retracted position. When the crossing arm reaches its fully retracted position, limit switch 66 will move into the indentation 30" as shown in FIG. 5a, in which case the aforesaid circuit through the motor 56 is opened and further movement of the crossing arm is stopped. Also, in this position, the circuit will return to the condition shown in FIG. 5a, and the green light 72 on the dashboard 68 will be illuminated to indicated to the operator that the crossing arm is in its retracted position.

As illustrated in FIG. 5e, it will be noted that if at any time during the movement of the crossing arm 16 back to its retracted position the operation wishes to stop such movement and return the crossing arm 16 to its fully extended position, it is only necessary for the operator to open the door of the school bus, whereupon the door switch 80 will close and the control circuit will be in the condition shown in FIG. 5b, and, as explained above, the crossing arm 16 will be moved outwardly to its extended position.

The above-described double-pole double-throw switch 78 may be used by the operator of the school bus to deactivate the crossing arm operating circuit altogether, whereby the entire circuit is inoperative. Thus, as seen in FIG. 5a, if the switch 78 is moved to its right-hand position all of the circuits through the motor 56 are opened, and a circuit is closed through the red light 70 and the audible device 74, thereby providing the operator with a visual and audible warning that the circuit has been deactivated. Moreover, if the crossing arm 16 is at any position other than its fully retracted position against the bumper 18 when the switch 78 is manually operated, the limit switch 66 will be at its closed position so that a circuit is completed through motor 56 as shown in FIG. 5e, whereupon the crossing arm 16 will be returned to its fully retracted position in the same manner as that described above in connection with the description of FIG. 5e, except that when the crossing arm 16 reaches its fully retracted position and limit switch 66 is open, the green light 72 will still not be illuminated until the driver returns the manual switch 78 to its lefthand position as shown in FIG. 5a to reactivate the entire system.

The advantages of the above-described fully automatic control circuit are significant. First, it will be noted that the most desirable position of the crossing arm 16 during loading or unloading of children is the fully extended or perpendicular position, and if the crossing arm 16 is moved to a less desirable position by any external force, such as a child pushing against the crossing arm 16, the control circuit will automatically return it to its fully extended position offering the greatest protection to the children. It will also be appreciated that the speed of the drive motor 56 and the specifications of the gear reduction unit 54 can be selected to insure that the movement of the crossing arm, whether toward and away from the bumper 18 during normal operation or when automatically being returned to its fully extended position, can be moved at a predetermined speed that is sufficiently slow to prevent any danger to a child who may be in the path of the moving crossing arm 16 (e.g. movement from the retracted position to the fully extended position, and vice versa, for about 3-4 seconds). Moreover, by virtue of the clutch assembly 38, even if a child is in the path of the moving crossing arm 16, or if a child should grasp the crossing arm 16 during such movement, the motor 56 can continue to operate without damaging any components of the operating system until the situation can be corrected by the operator of the school bus.

In the embodiment of the present invention designed for semi-automatic control, the control circuit is illustrated in FIGS. 6a-6e. In this circuit, only two limit switches 90 and 92 are required, and the cam surface 30' and the longitudinal grooves 30" are somewhat modified as illustrated in FIG. 6a-6f. Looking first at FIG. 6a which shows the control circuit in its normal condition during movement of the bus when no children are being loaded or unloaded, the crossing arm 16 is shown at its retracted position alongside the bumper 18. In this condition, the double-throw double-pole manually operated switch 78 is shown at its lowermost position, and as shown by the heavy lines, a circuit is completed through the green light 70, the manually operated switch 78 and the limit switch 92 whereby the illuminated green light indicates to the bus operator that the crossing arm 16 is located at its retracted position, it being noted, also, that the circuit through motor 56 is open in this condition of the control circuit.

Figure 6C:
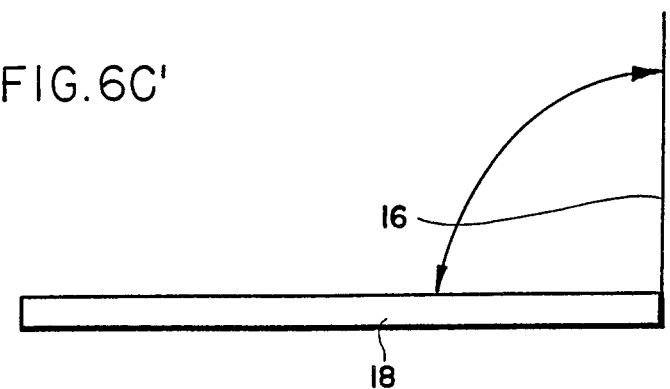
Figure 6C:
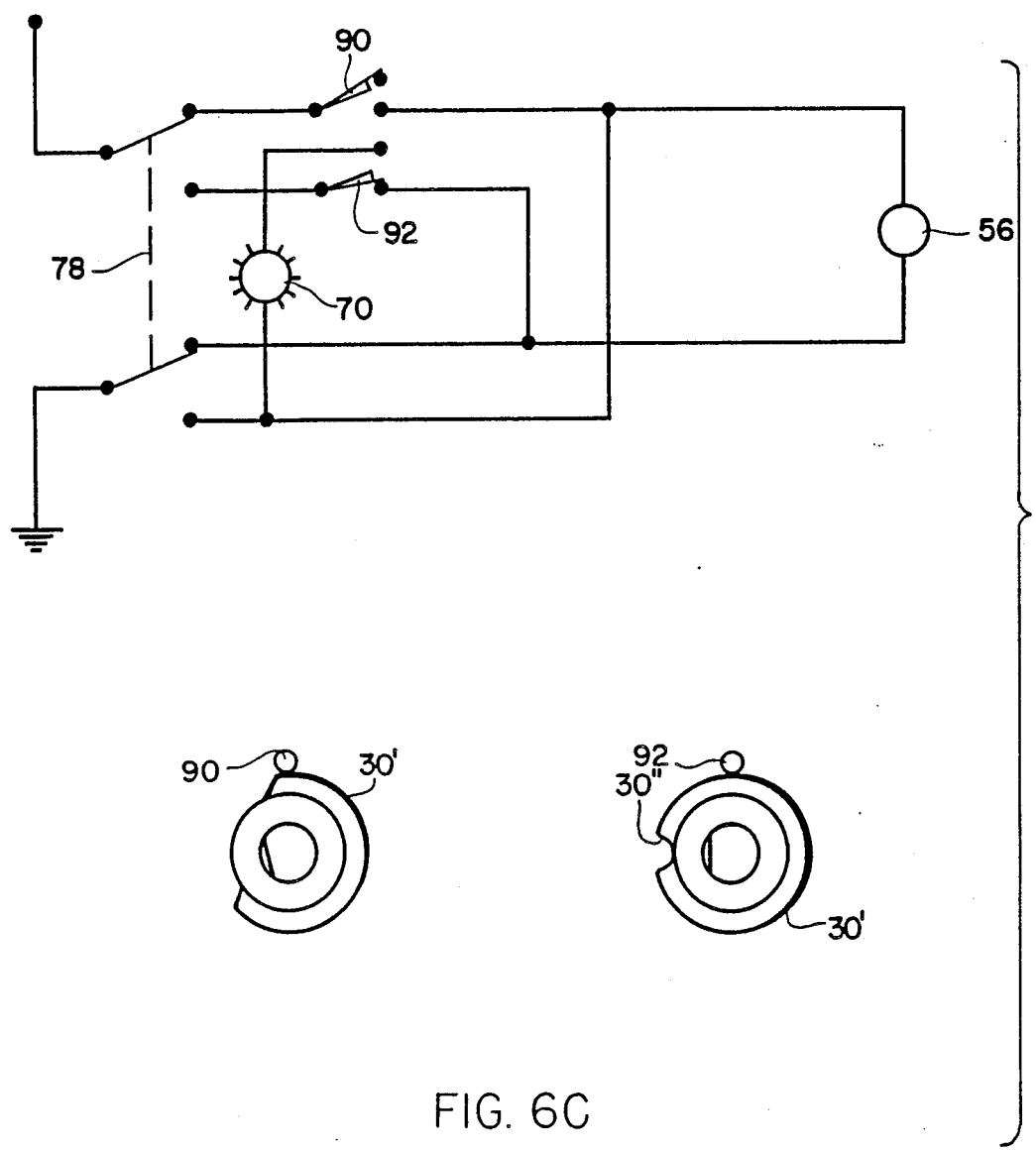
Figure 6E:
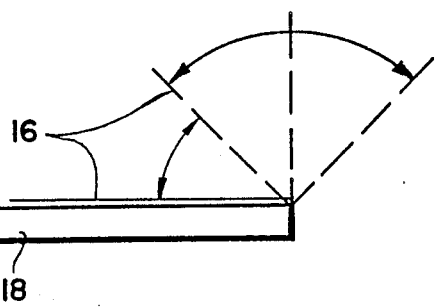
Figure 6E:
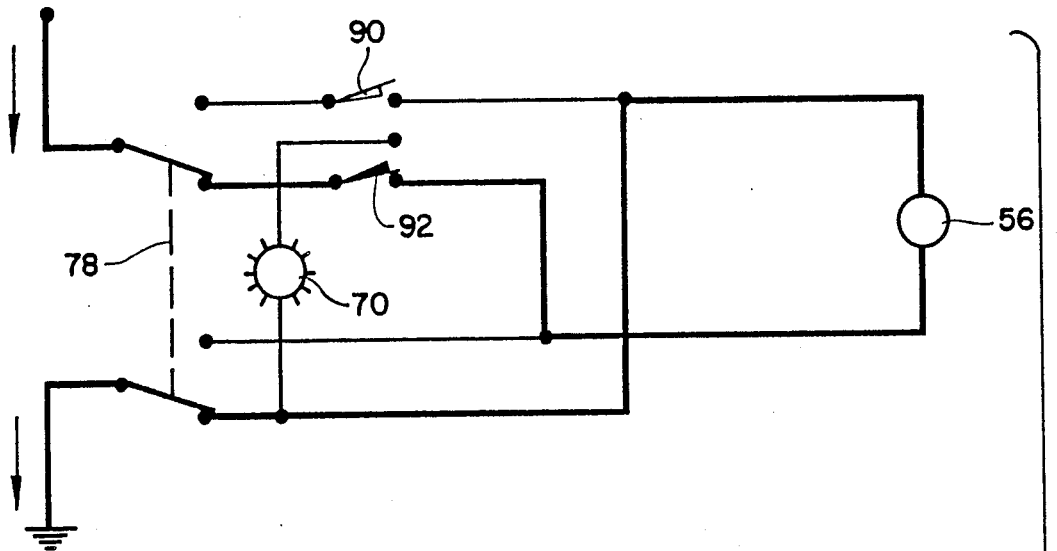
Figure 6E:
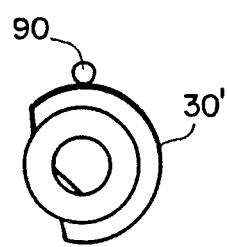
Figure 6E:
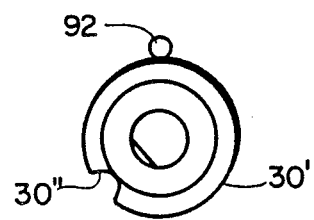

When the bus is stopped and children are loaded or unloaded, the operator will actuate the manual switch 78 to its upper position as shown in FIG. 6b. This completes a circuit through limit switch 90 and motor 56 so that the motor 56 operates the pivot member 24 through the clutch assembly 38 in the manner described above to move the crossing arm 16 outwardly away from the bumper 18 toward its fully extended position. When the crossing arm 16 reaches is fully open position, the cam surface 30′ will move the limit sitch 90 to its open possition (see FIG. 6C), thereby opening the circuit through motor 56 and stopping further movement of the crossing arm 16 so that it remains at its fully extended position. If, however, the crossing arm is forced back towards the bumper 18 by a predetermined force, such as a child pushing against the crossing arm as described above, limit switch 90 will again be closed and the circuit will assume the condition shown in FIG. 6b so that the crossing arm iis automatically returned to its fully extended position, whereupon limit be opened and further movement of the crossing arm 16 will be stopped.

On the other hand,, if a predetermined force is applied to the crossing arm to move it beyond its fully extended position and away from the bumper 18 as shown in FIG. 6d, the clutch assembly 38 will permit this movement without any damage to the motor 56 or the drive arrangement, and the control circuit will be unchanged so that the crossing arm 16 will simply remain at the position to which it has been forced. However, the operator can, at any time,, selectively cause the crossing arm 16 to be returned to its fully retracted position alongside the bumper 18 by moving the toggle switch 78 to its lowermost position, whereupon the control circuit assumes the condition shown in FIG. 6e in which a circuit is completed through limit switch 92 and motor 56 18. When the crossing arm reaches its fully retracted position, the limit switch 92 will fall into the groove 30″ and the control circuit will assume the condition shown in FIG. 6a at which it started, with the green light 70 being illiminated.

Thus, with the above-described semi-automatic circuit, the crossing arm 16 is automatically returned to its fully extended position when it is improperly forced back towards its retracted position so as to obtain some of the advantages set forth above in connection with the automatic operation, and if the crossing arm is moved beyond its fully extended position it can be readily returned to its fully retracted position by the operator simply manually positioning the switch 78. This semi-automatic control circuit offers significant advantages in terms of simplicity of operation and reduced costs, while still providing many of the advantages offered by the automatic system described above.

Figure 7A:
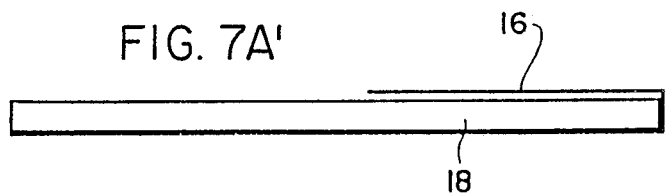
FIGS. 7A-7D illustrate diagrammatically the control circuit operation of the present invention in the manual embodiment.
Figure 7A:
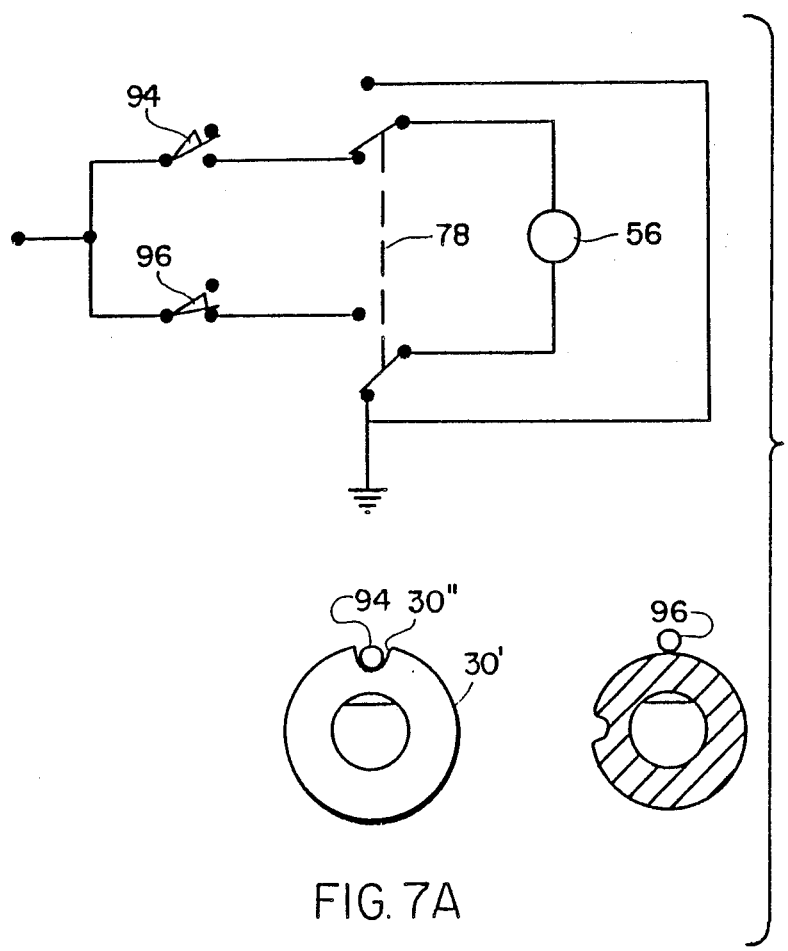

In another embodiment of the present invention, a manually operated control circuit is provided as shown in FIGS. 7a–7d. FIG. 7a shows the control circuit in its normal operating condition when the bus is moving and no children are being loaded or unloaded. In this condition, limit switch 94 is open and limit switch 96 is closed, and there is no current flow through motor 56 because of the open contact provided by manual switch 78 and the open limit switch 94.

Figure 7B:
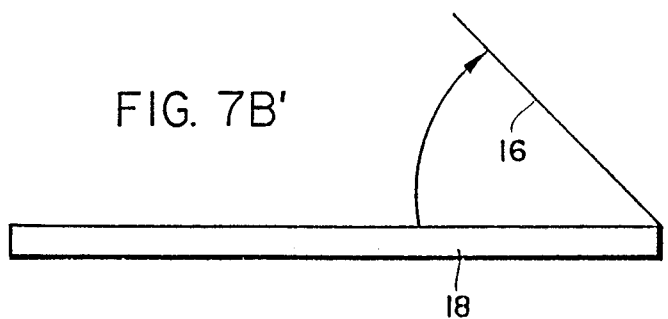
Figure 7B:
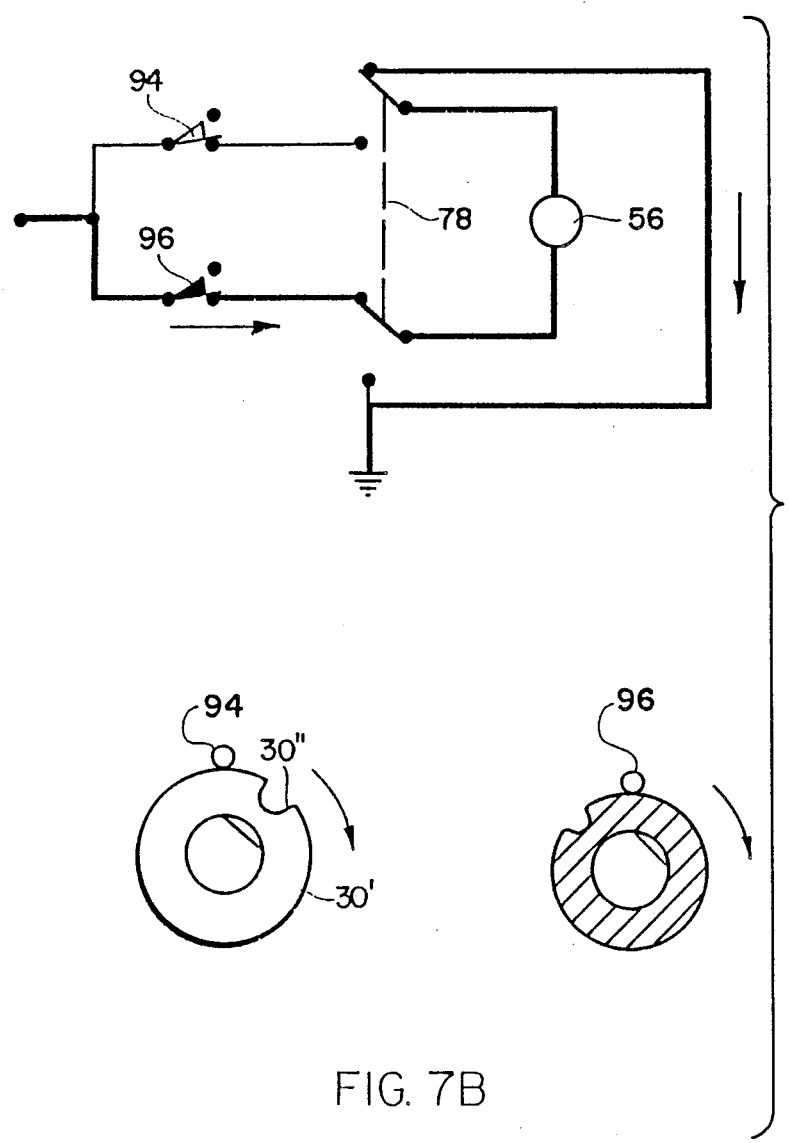
Figure 7C:
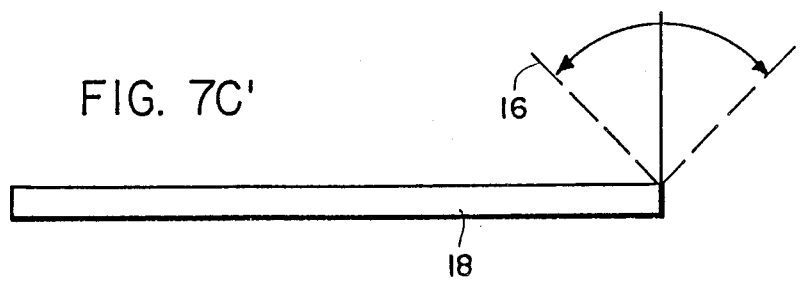
Figure 7C:
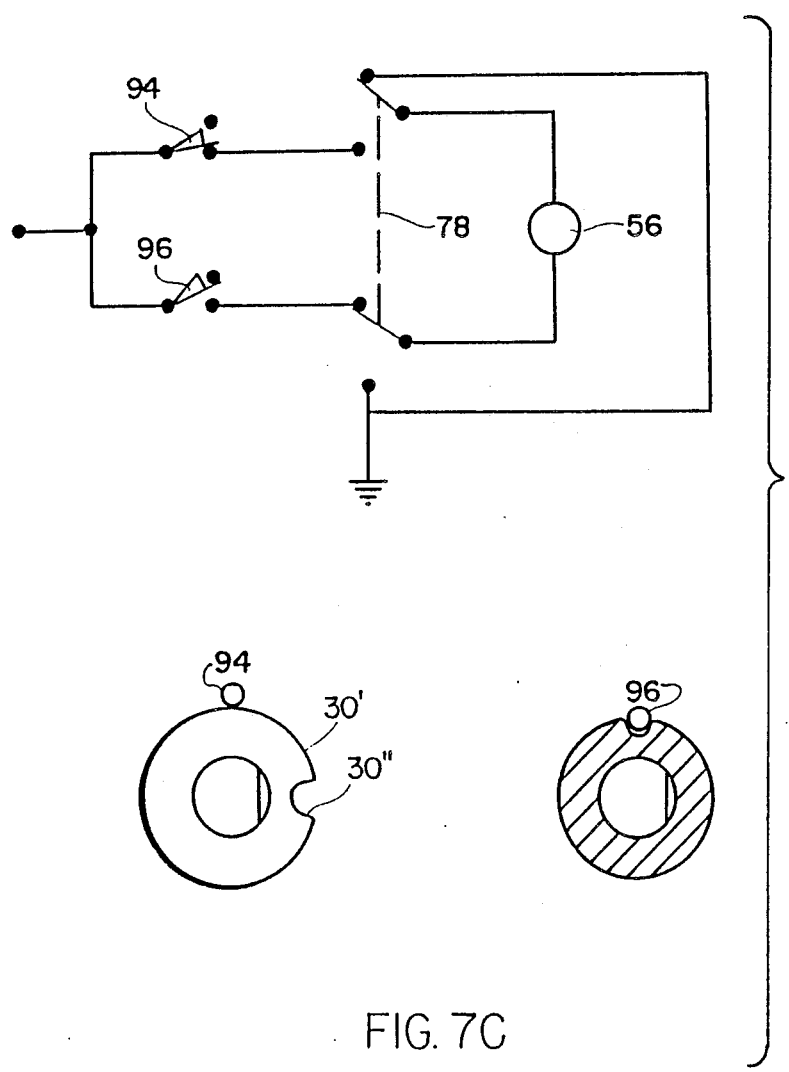
Figure 7D:
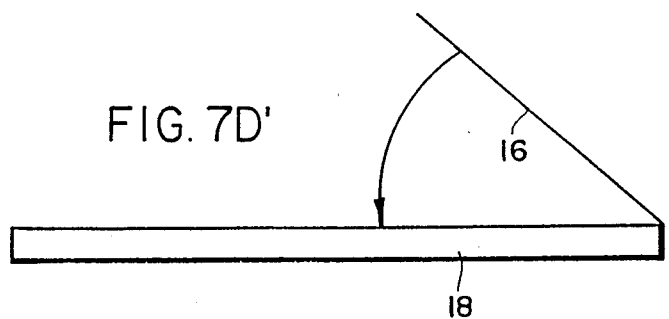
Figure 7D:
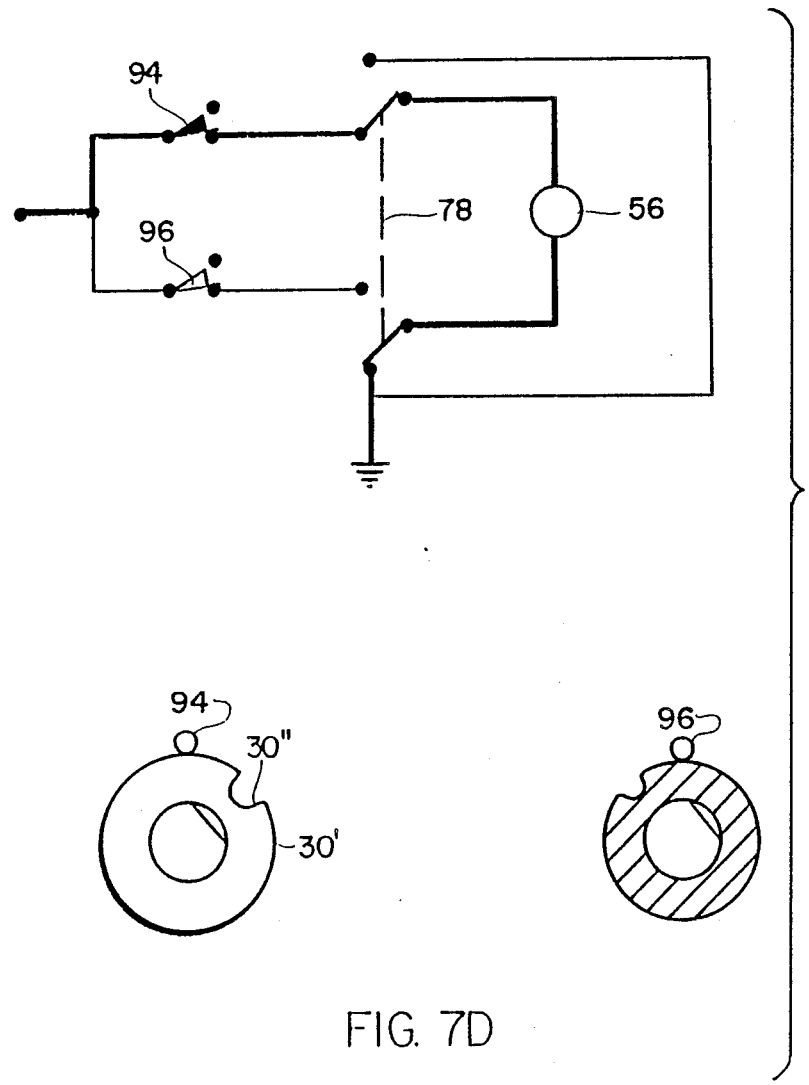

When the bus stops, the operator manually activates switch 78 to its upper position as shown in FIG. 7b so that a circuit is completed through closed limit switch 96 and the motor 56 as indicated by the heavy line. The crossing arm 16 will move outwardly away from the bumper 18 until limit switch 96 falls into the groove 30″ so that limit switch 96 is opened to de-energize motor 56 and stop further movement of the crossing arm 16, which is now positioned at its fully extended position perpendicular to the bumper 18. If, in this position, the crossing arm 16 is manually pushed in either direction away from its fully extended position, such as shown by the direction arrows in FIG. 7c, the control circuit will remain in a deactivated condition since limit switch 96 is closed only at the fully extended position of the crossing arm 16. As described above, the clutch assembly 38 will permit this forced movement of the crossing arm in either direction beyond its fully extended position without damage to the drive motor or drive assembly, and the crossing arm 16 will simply remain at the position to which it is forced. The operator of the bus can, however, selectively cause the crossing arm 16 to be returned to its fully retracted position by manually moving the toggle switch to its lowermost position as shown in FIG. 7d whereupon a circuit is completed through limit switch 94 and the motor 56 to move the crossing arm 16 towards the bumper 18. When the crossing arm 16 reaches the bumper 18, limit switch 94 will move into groove 30″ and the control circuit will assume its original condition as shown in FIG. 7a.

The aforesaid manually operated circuit also offers an inexpensive and simple control circuit by which the crossing arm 16 can always be selectively returned to its inactive or retracted position against the bumper, even if the crossing arm 16 has been forced away from its fully extended position by a child. Also, it will be noted that the combination of this control circuit with the previously described clutch assembly 38 also incorporates a built-in safety factor in that forced movement of the crossing arm 16 in any direction will not cause any damage to the motor 56 or its drive assembly, and, more importantly, if the crossing arm 16, even moving at a slow speed, should engage a child, the clutch assembly 38 will permit the motor to continue operating and will permit the crossing arm 16 to stop under the influence of the obstruction caused by the child so as not to injure the child. In this regard, and in all of the embodiments of the present invention, any "whipping" of the crossing arm, which can occur in prior art arrangements as discussed above, is eliminated, thereby providing a further safety feature.

Finally, while the description of the three embodiments of the control circuit set forth above have been given in terms of operating a crossing arm 16, it is expressly understood that the same construction and same control circuits could be used to operate a stop sign 12 in the same manner as that described above. Thus, the stop sign 12 would be mounted on the pivot member 24 shown in FIG. 2, rather than the pivot member 24 forming part of the crossing arm 16.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. An actuating device for operating a safety unit mounted on a vehicle and moved between a first retracted position adjacent the vehicle and a second extended position extending outwardly from the vehicle, such actuating device including:
   (a) housing means for mounting said actuating device on said vehicle;
   (b) motor means having an output drive means driven by an electric motor;
   (c) movable pivot means for supporting and moving said safety unit between said first and second positions, said pivot means being mounted in said housing means;
   (d) clutch means interconnecting said motor means and said pivot means, said clutch means normally providing a positive driving engagement between said motor drive means and said pivot means whereby said pivot means is moved by said motor output drive means between said first and second positions, and said clutch means also permitting said pivot means to be moved relative to said motor drive means when a predetermined force is applied at said pivot means; and
   (e) control means for operating said electric motor to selectively move said pivot means between said first and second positions, said control means being selectively operable to cause said electric motor to return said pivot means to said first or second position when it has been moved relative to said motor drive means by the application of said predetermined force; and said clutch means being operable to cause said pivot means to remain at any position to which it is moved relative to said motor drive means until said pivot means is returned to said first or second position by said control means.

2. An actuating device as defined in claim 1 and further characterized in that said control means includes a manually operated switch for selectively operating said control means to return said pivot means to said first or second position.

3. An actuating device as defined in claim 1 and further characterized in that said control means automatically returns said pivot means to said first or second position at a predetermined speed whenever said pivot means is moved from said first or second position by said predetermined force.

4. An actuating device as defined in claim 1 and further characterized in that said control means includes an on-off switch for energizing said motor means to move said pivot means between said first and second positions, and includes limit switch means for de-energizing said motor means when said pivot means reaches said first and second positions.

5. An actuating device as defined in claim 4 and further characterized in that said control circuit includes shaft means associated with said pivot means and being rotatable when said pivot means moves between said first and second positions, said shaft means including means for operating said limit switch means.

6. An actuating device as defined in claim 1 and further characterized in that said clutch means includes a slip clutch having a first movable portion connected to said motor drive means, a second movable portion connected to said pivot means, and frictional means for simultaneously engaging said first and second clutch portions during said positive driving engagement between said motor drive means and said pivot means, said frictional means permitting disengagement of said first or said second movable portions when said predetermined force is applied to said pivot means.

7. An actuating device for operating a safety unit mounted on a vehicle and moved between a first retracted position adjacent the vehicle and a second extended position extending outwardly from the vehicle, said actuating device including:
   (a) housing means for mounting said actuating device on said vehicle;
   (b) motor means having an output drive means;
   (c) movable pivot means for supporting and moving said safety unit between said first and second positions, said pivot means being mounted in said housing means;
   (d) clutch means interconnecting motor means and said pivot means, said clutch means normally providing a positive driving engagement between said motor drive means and said pivot means whereby said pivot means is moved by said motor output drive means between said first and second positions, and said clutch means also permitting said pivot means to be moved relative to said motor drive means when a predetermined force is applied at said pivot means; and
   (e) control means for operating said motor means to selectively move said pivot means between said first and second positions and to selectively cause said motor means to return said pivot means to said first or second position when it has been moved relative to said motor drive means by the application of said predetermined force, said control means including signal means located within said vehicle for generating a first discernable signal to the operator of the vehicle when said pivot means is at said first position, and for generating a second discernable signal when said pivot means is at any position other than said first position; and said clutch means being operable to cause said pivot means to remain at any position to which it is moved relative to said motor drive means until said pivot means is returned to said first or second position by said control means.

8. An actuating device as defined in claim 7 and further characterized in that said signal means includes light means located within said vehicle, and in that said control means causes one said light means to be lighted when said pivot means is at said first position and causes said light means to be unlighted when said pivot means is at any position other than said first position.

9. An actuating device as defined in claim 7 and further characterized in that said clutch means includes a slip clutch having a first movable portion connected to said motor drive means, a second movable portion connected to said pivot means, and frictional means for simultaneously engaging said first and second clutch portions during said positive driving engagement between said motor drive means and said pivot means, said frictional means permitting disengagement of said first or said second movable portions when said predetermined force is applied to said pivot means.

10. An actuating device for operating a safety unit mounted on a vehicle and moved between a first retracted position adjacent the vehicle and a second extended position extending outwardly from the vehicle, said actuating device including:
   (a) housing means for mounting said actuating device on said vehicle;
   (b) an electric motor means having a drive shaft rotated by said motor means;
   (c) pivot means for supporting said safety unit;
   (d) slip clutch means having a first rotatable portion connected to said motor drive shaft for rotation thereby, a second rotatable protion having a driven shaft connected thereto for rotation therewith, said driven shaft being connected to said pivot means, and a sleeve frictionally engaging said first and second rotatable portions with sufficient purchase to cause said first and second portions to normally rotate together when said motor means is energized, said engagement force permitting relative rotation of said second rotatable portion with respect to said first rotatable portion when a predetermined torque is applied to said pivot means and said driven shaft of said second rotatable member; and
   (e) an electrical control circuit for controlling the operation of said electric motor means to selectively move said pivot means between said first and second positions, said control circuit including:
      (i) switch means for selectively energizing said motor means to move said pivot means;
      (ii) limit switch means for de-energizing said motor means when said pivot means reaches either of said first or second positions, said limit switch means and said switch means being arranged to automatically energize said motor means whenever said pivot means is moved from said first or second position by the application of said predetermined torque and to return said pivot means to said first or second position from which it was moved at a predetermined speed of movement.

11. An actuating device as defined in claim 10 and further characterized in that said toggle switch means is located within said vehicle, and in that said control circuit includes first indicator light means located within said vehicle which is energized only when said pivot member is in said first position and which is de-energized only when said pivot member is at any position other than said first position.

12. An actuating device for operating a safety unit mounted on a vehicle and moved between a first retracted position adjacent the vehicle and a second extended position extending outwardly from the vehicle, said actuating device including:
   (a) housing means for mounting said actuating device on said vehicle;
   (b) an electric motor means having a drive shaft rotated by said motor means;
   (c) pivot means for supporting said safety unit;
   (d) slip clutch means having a first rotatable portion connected to said motor drive shaft for rotation thereby, a second rotatable portion having a driven shaft connected thereto for rotation therewith, said driven shaft being connected to said pivot means, and a sleeve frictionally engaging said first and second rotatable portions with sufficient purchase to cause said first and second portions to normally rotate together when said motor means is energized, said engagement force permitting relative rotation of said second rotatable portion with respect to said first rotatable portion and said sleeve when a predetermined torque is applied to said pivot means and said driven shaft of said second rotatable member; and
   (e) an electrical control circuit for controlling the operation of said electric motor means to selectively move said pivot means between said first and second positions, said control circuit including:
      (i) toggle switch means for selectively energizing said motor means to move said pivot means;
      (ii) limit switch means for de-energizing said motor means when said pivot means reaches either of said first or second positions, said limit switch means and said toggle switch means being arranged to re-energize said motor by manually changing the position of said toggle switch means to return said pivot means to said first or second positions at a predetermined speed whenever said pivot means is moved from said first or second positions by the application of said predetermined torque.

13. An actuating device as defined in claim 12 and further characterized in that said toggle switch means is located within said vehicle, and in that said control circuit includes indicator light means located within said vehicle which is energized whenever said pivot means is in said first position and de-energized whenever said pivot means is at any position other than said first position.

14. An actuating device for operating a safety unit mounted on a vehicle and moved between a first retracted position adjacent the vehicle and a second extended position extending outwardly from the vehicle, such actuating device including:
   (a) housing means for mounting said actuating device on said vehicle;
   (b) motor means having an output drive means driven by an electric motor;
   (c) movable pivot means for supporting and moving said safety unit between said first and second positions, said pivot means being mounted in said housing means;
   (d) means interconnecting said motor means and said pivot means for causing primary movement of said safety unit between said first and second positions, said interconnecting means permitting secondary movement of said pivot means away from said first and second positions when a predetermined force other than the force of said motor means is applied thereto; and
   (e) control means for operating said electric motor to selectively move said pivot means between said first and second positions, said control means being selectively operable to automatically cause said electric motor to return said pivot means to said first or second position whenever it has been moved away from said first or second position by the application of said predetermined force.

15. An actuating device for operating a safety unit mounted on a vehicle and moved between a first retracted position adjacent the vehicle and a second extended position extending outwardly from the vehicle, such actuating device including:
   (a) housing means for mounting said actuating device on said vehicle;
   (b) motor means having an output drive means driven by an electric motor;
   (c) movable pivot means for supporting and moving said safety unit between said first and second positions, said pivot means being mounted in said housing means;
   (d) means interconnecting said motor means and said pivot means for causing primary movement of said safety unit between said first and second positions, said interconnecting means permitting secondary movement of said pivot means away from said first and second positions when a predetermined force other than the force of said motor means is applied thereto; and
   (e) control means for operating said electric motor to selectively move said pivot means between said first and second positions, said control means being selectively operable to automatically cause said electric motor to return said pivot means to said second position thereof when it is moved in one direction away from said second position by a predetermined force other than said electric motor.

16. An actuating device as defined in claim 15 and further characterized in that said control means is selectively operable to permit said pivot means to remain at any position to which it is moved in the other direction away from said second position by a predetermined force other than said motor means and in that said control means includes a manually operable switch for causing said control circuit to return said pivot means to its first position from said any position.

17. An actuating device for operating a safety unit mounted on a vehicle and moved between a first retracted position adjacent the vehicle and a second extended position extending outwardly from the vehicle, such actuating device including:
   (a) housing means for mounting said actuating device on said vehicle
   (b) motor means having an output drive means driven by an electric motor;
   (c) movable pivot means for supporting and moving said safety unit between said first and second positions, said pivot means being mounted in said housing means;
   (d) means interconnecting said motor means and said pivot means for causing movement of said safety unit between said first and second positions;
   (e) control means for operating said electric motor to selectively move said pivot means between said first and second positions, said control means including an on-off switch means and being operable to automatically cause said electric motor to immediately return said pivot means to said first position from any point in its movement between said first and second positions when said switch means is moved to a selected one of its on or off positions.

18. An actuating device for operating a safety unit mounted on a vehicle and moved between a first retracted position adjacent the vehicle and a second extended position extending outwardly from the vehicle, such actuating position extending outwardly from the vehicle, such actuating device including:
   (a) housing means for mounting said actuating device on said vehicle;
   (b) motor means having an output drive means driven by an electric motor;
   (c) movable pivot means for supporting and moving said safety unit between said first and second positions, said pivot means being mounted in said housing means;
   (d) means interconnecting said motor means and said pivot means for causing movement of said safety unit between said first and second positions; and
   (e) control means for operating said motor means to selectively move said pivot means between said first and second positions, said control means including an on-off switch means and being operable to automatically cause said electric motor to immediately return said pivot means to said second position from any point during its movement from said second position toward said first position when said on-off switch means is moved to a selected one of its on or off positions.

* * * * *

UNITED STATES PATENT AND TRADEMARK OFFICE
CERTIFICATE OF CORRECTION

PATENT NO. : 4,983,949

DATED : January 8, 1991

INVENTOR(S) : James H. Wicker

It is certified that error appears in the above-identified patent and that said Letters Patent is hereby corrected as shown below:

Column 2, Line 20, reads "units" but should read -- unit is --.

Column 7, Line 62, reads "to indicated" but should read -- to indicate --.

Column 7, Line 67, reads "operation" but should read -- operator --.

Column 8, Line 62, reads "FIG. 6a-6f." but should read -- FIGS. 6a-6e. --.

Column 9, Line 16, reads "is" but should read -- its --.

Column 9, Lines 17-18, read "possition" but should read -- position --.

Column 9, Line 26, reads "iis" but should read -- is --.

Column 9, Line 29, after "limit" add -- switch 90 will --.

Column 9, Line 30, after "hand," delete -- , --.

Column 9, Line 38, after "time," delete -- , --.

Column 9, Line 44, after "motor 56" add -- to move the crossing arm 16 in the desired direction toward the bumper --.

Column 9, Line 48, reads "illiminated" but should read -- illuminated --.

Column 13, Line 22, reads "protion" but should read -- portion --.

Column 13, Line 52, after "said" delete -- toggle --.

Column 16, Line 2, after "vehicle" add -- ; --.

UNITED STATES PATENT AND TRADEMARK OFFICE
CERTIFICATE OF CORRECTION

PATENT NO. : 4,983,949

DATED : January 8, 1991

INVENTOR(S) : James H. Wicker

It is certified that error appears in the above-identified patent and that said Letters Patent is hereby corrected as shown below:

Column 16, Line 11, after "positions;" add -- and --.

Column 16, Lines 25-26, after "actuating" delete -- position extending outwardly from the vehicle, such actuating --.

Signed and Sealed this

Fifteenth Day of December, 1992

Attest:

DOUGLAS B. COMER

Attesting Officer

Acting Commissioner of Patents and Trademarks